United States Patent [19]
Puschell

[11] Patent Number: 5,444,528
[45] Date of Patent: Aug. 22, 1995

[54] TUNABLE SPECTROMETER WITH ACOUSTO-OPTICAL TUNABLE FILTER

[75] Inventor: Jeffrey J. Puschell, Albuquerque, N. Mex.

[73] Assignee: The Titan Corporation, San Diego, Calif.

[21] Appl. No.: 281,411

[22] Filed: Jul. 27, 1994

[51] Int. Cl.$^6$ ............................ G01J 3/12; G01J 3/42; G01J 3/44
[52] U.S. Cl. .................................... 356/73; 356/301; 356/326
[58] Field of Search ................. 356/73, 301, 308, 319, 356/326, 328; 280/339.01, 339.02, 339.06, 339.07, 343; 359/308, 309

[56] References Cited

U.S. PATENT DOCUMENTS

| | | | |
|---|---|---|---|
| 3,610,757 | 10/1971 | Valkenburg et al. | 356/301 |
| 3,792,287 | 2/1974 | Roland et al. | 307/88.3 |
| 3,850,525 | 11/1974 | Kaye | 356/301 |
| 3,914,055 | 10/1975 | Wolga et al. | 356/301 |
| 4,115,006 | 9/1978 | Reymond et al. | 356/152 |
| 4,422,154 | 12/1983 | Smithline et al. | 364/571 |
| 4,490,845 | 12/1984 | Steinbruegge et al. | 382/1 |
| 4,564,949 | 6/1986 | Trolinger | 372/93 |
| 4,622,845 | 11/1986 | Ryan et al. | 73/24 |
| 4,652,756 | 3/1987 | Ryan et al. | 250/343 |
| 4,653,869 | 3/1987 | Gottlieb et al. | 359/308 |
| 4,663,961 | 5/1987 | Nelson et al. | 73/24 |
| 4,883,963 | 11/1989 | Kemeny et al. | 250/339 |
| 4,893,259 | 1/1990 | Grosser et al. | 364/525 |
| 5,013,918 | 5/1991 | Choi | 250/338.4 |
| 5,022,755 | 6/1991 | Wells et al. | 356/307 |
| 5,041,723 | 8/1991 | Ishida et al. | 250/339 |
| 5,061,854 | 10/1991 | Kroutil et al. | 250/339 |
| 5,076,699 | 12/1991 | Ryan et al. | 356/437 |
| 5,081,998 | 1/1992 | Yelderman et al. | 128/719 |
| 5,097,130 | 3/1992 | Koashi et al. | 250/339 |
| 5,159,199 | 10/1992 | LaBaw | 250/339 |
| 5,210,702 | 5/1993 | Bishop et al. | 364/496 |
| 5,216,484 | 6/1993 | Chao et al. | 356/326 |

FOREIGN PATENT DOCUMENTS 214129 12/1983 Japan .................................. 359/308

OTHER PUBLICATIONS

NASA Tech Briefs "Fiber-Coupled Acousto-Optical-Filter Spectrometer", May 1993 pp. 42–43.
NASA Tech Briefs "Integrated Grating Spectrometer" Sep. 1990, p. 802.
Leonard, "Observartion of Raman Scattering ... ", Nature, vol. 216, pp. 142–143 (1967).

Primary Examiner—F. L. Evans
Attorney, Agent, or Firm—Edward W. Callan

[57] ABSTRACT

A tunable spectrometer includes an acousto-optical tunable filter disposed for filtering light from a discrete light source, wherein the light emerges from the filter in a simultaneous plurality of distinct beams having different orders of diffraction, with different diffraction orders having different wavelength ranges and with complementary pairs of said distinct beams having the same diffraction order respectively having substantially the same wavelength ranges. The filter is tuned to diffract light in a simultaneous plurality of distinct beams having different predetermined diffraction orders that have different wavelength ranges that include wavelengths that are characteristic of a spectrum for a given substance; and a set of a given plural number of detectors respectively detect the filtered light diffracted by the filter to thereby simultaneously provide test signals indicative of a spectrum within a spatial region of interest at wavelengths that are characteristic of the spectrum for the given substance. Another spectrometer that detects light at a wavelength that is characteristic of a Raman scattering spectrum for a given substance includes a test cell disposed within the spatial region of interest and including a plurality of mirrors disposed within the cell for reflecting the light to pass a plurality of round trips between the mirrors before emerging from the spatial region of interest to thereby enhance Raman scattering of the light by any molecules of the given substance within the cell while the light passes through the spatial region of interest.

15 Claims, 3 Drawing Sheets

TUNABLE SPECTROMETER WITH ACOUSTO-OPTICAL TUNABLE FILTER

BACKGROUND OF THE INVENTION

The present invention generally pertains to tunable spectrometers and is particularly directed to improvements in such spectrometers as include an acousto-optical tunable filter (AOTF).

Spectrometers are useful for detecting the concentration of given substances in a region of interest, and are commonly used in systems for a myriad of such applications, including monitoring the levels of pollutants in automobile and industrial plant emissions and detecting the presence of toxic gases in a region of interest.

The use of an acousto-optical tunable filter in a tunable spectrometer is described in an article entitled "Fiber-Coupled Acousto-Optical-Filter Spectrometer", NASA Tech Briefs, May, 1993, pp.42–43. The spectrometer described therein includes a discrete broadband visible or infrared light source; a first optical system disposed in relation to the light source for collimating light from the light source, for directing the collimated light through an acousto-optical tunable filter and for focusing the filtered directed light to the input of a first optical fiber; a second optical system for collimating light from the output of the first optical fiber, for directing the collimated light through a region of interest enclosed within a test cell and for focusing the directed light to the input of a second optical fiber on the opposite side of the region of interest from the first optical fiber. The filter is tuned through a predetermined series of different wavelengths that are characteristic of a spectrum for one or more given substances; and a detector is coupled to the output of the second optical fiber for detecting the filtered directed light at each of the different tuned wavelengths to thereby provide a signal indicative of a spectrum for the region of interest at wavelengths that are characteristic of the energy absorption spectrum for the one or more given substances.

SUMMARY OF THE INVENTION

The present invention provides a tunable spectrometer, comprising a discrete light source; an optical system disposed in relation to the light source for directing light from the light source through a spatial region of interest and for focusing the directed light; an acousto-optical tunable filter disposed for filtering light from the light source, wherein the light emerges from the filter in a simultaneous plurality of distinct beams having different orders of diffraction, with different diffraction orders having different wavelength ranges and with complementary pairs of said distinct beams having the same diffraction order respectively having substantially the same wavelength ranges; means coupled to the filter for tuning the filter to diffract light in a simultaneous plurality of distinct beams having different predetermined diffraction orders that have different wavelength ranges that include wavelengths that are characteristic of a spectrum for a given substance or of the spectra for a plurality of different given substances; and a set of a given plural number of detectors disposed in relation to the optical system and the filter for respectively detecting the focused and filtered light diffracted by the filter in a set of said given number of said distinct beams of said different predetermined diffraction orders to thereby simultaneously provide said given number of test signals indicative of a spectrum within the spatial region of interest at wavelengths that are characteristic of said spectrum for said given substance or of the spectra for the plurality of different said given substances. By providing a plurality of test signals simultaneously derived from filtered light in different predetermined wavelength ranges, the spectrometer of the present invention provides reliable extended waveband measurements that are not affected by any instability in the light source.

In another aspect, the present invention provides a tunable spectrometer, comprising a discrete light source; an optical system disposed in relation to the light source for directing light from the light source through a spatial region of interest and for focusing the directed light; an acousto-optical tunable filter disposed for filtering light from the light source, wherein the light emerges from the filter in a simultaneous complementary pair of distinct beams having the same order of diffraction and substantially the same wavelength range; means coupled to the filter for tuning the filter to diffract light in a simultaneous complementary pair of said distinct beams having a predetermined diffraction order that has a wavelength range that includes a wavelength that is characteristic of a spectrum for a given substance; a first detector disposed in relation to the optical system and the filter for detecting the focused and filtered light diffracted by the filter in one said beam of said predetermined diffraction order to thereby provide a test signal indicative of a spectrum within the spatial region of interest at a wavelengths that is characteristic of said spectrum for said given substance; and a second detector disposed in relation to the optical system and the filter for detecting the filtered light diffracted by the filter in the complementary other said beam of said predetermined diffraction order to thereby provide simultaneously with the test signal a reference signal indicative primarily of a spectrum of the light source at a wavelength that is characteristic of said spectrum for said given substance. By providing simultaneous reference and test signals respectively derived from simultaneous complementary diffracted beams of filtered light, the spectrometer of this aspect of the present invention provides reliable measurements that are not affected by any instability in the light source.

In a further aspect, the present invention provides a spectrometer, comprising a discrete light source; an optical system disposed in relation to the light source for directing light from the light source through a spatial region of interest and for focusing the directed light; a detector disposed in relation to the optical system for detecting the focused light at a wavelength that is characteristic of a Raman scattering spectrum for a given substance to thereby provide a test signal indicative of a Raman scattering spectrum within the spatial region of interest at a wavelength that is characteristic of said Raman scattering spectrum for said given substance; means for processing the test signal to measure the concentration of said given substance within the spatial region of interest in accordance with a Raman forward scattering measurement technique; a test cell disposed within the spatial region of interest and comprising a plurality of mirrors disposed within the cell for reflecting the light to pass a plurality of round trips between the mirrors before emerging from the spatial region of interest to thereby enhance Raman scattering of the light by any molecules of said given substance within the cell while the light passes through the spatial region of interest. Although Nitrogen in the atmosphere has been detected by a Raman scattering spectrum measurement technique described in a publication by Leonard, D. A. "Observation of Raman Scattering from the Atmosphere Using a Pulsed Nitrogen Ultraviolet Laser", Nature, Vol. 216, PP 142-143 (1967), such measurements were made by measuring back scattered light, whereby the spectrometer of this aspect of the present invention uses a forward Raman scattering measurement technique to better facilitate the overall design of the spectrometer. Preferably the measurement technique used the Raman scattering spectrometer of the present invention is a vibrational-rotational forward Raman scattering measurement technique to thereby minimize the possibility of overlapping transitions between different gases.

In a still further aspect, the present invention provides a spectrometer in which the concentration of a given substance in a spatial region of interest is measured simultaneously by both an energy absorption spectrum measurement technique and a Raman forward scattering spectrum measurement technique. This spectrometer combines the components of the Raman forward scattering spectrometer described above with a second discrete light source; a second optical system disposed in relation to the second light source and the spatial region of interest for directing light from the second light source through the spatial region of interest and for focusing the directed light from the second light source; an acousto-optical tunable filter disposed for filtering light from the second light source; means coupled to the filter for tuning the filter to provide the filtered light at a tuned wavelength that is characteristic of an energy absorption spectrum for said given substance; a second detector disposed in relation to the optical system for detecting the focused and filtered light from the second light source at said tuned wavelength to thereby provide a second test signal indicative of an energy absorption spectrum for said spatial region of interest at a wavelength that is characteristic of said energy absorption spectrum for said given substance; and means for processing the second test signal to measure the concentration of said given substance within the spatial region of interest in accordance with an energy absorption spectrum measurement technique. By providing simultaneous measurements by both a Raman forward scattering spectrum measurement technique and an energy absorption spectrum measurement technique, the spectrometer of this aspect of the present invention provides more comprehensive measurements that are not affected by any instability in the light source.

Additional features of the present invention are described in relation to the detailed description of the preferred embodiments.

DETAILED DESCRIPTION

Figure 1:
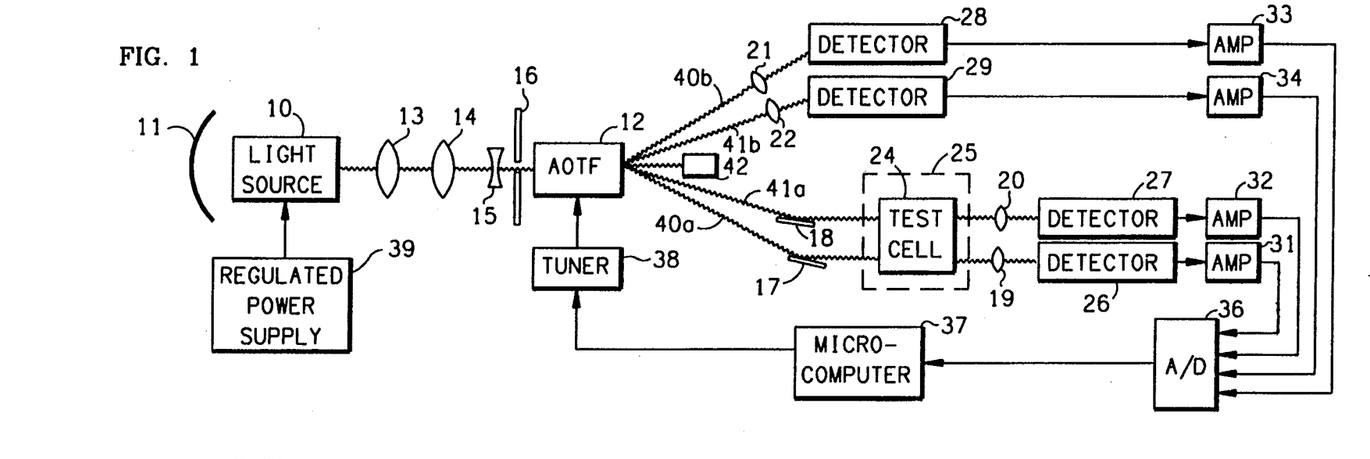
FIG. 1 is a block diagram of a preferred embodiment of the tunable spectrometer according to one aspect of the present invention.

Referring to FIG. 1, one preferred embodiment of a tunable spectrometer according to the present invention includes a discrete light source 10, a reflector 11, a temperature-controlled narrowband acousto-optical tunable filter (AOTF) 12, an optical system including a first collimating lens 13, a first collection lens 14, a second collimating lens 15, a plate 16 defining a spatial aperture, a first mirror 17, a second mirror 18, a second collection lens 19, a third collection lens 20, a fourth collection lens 21 and a fifth collection lens 22, a test cell 24, a first detector 26, a second detector 27, a third detector 28, a fourth detector 29, a first amplifier 31, a second amplifier 32, a third amplifier 33, a fourth amplifier 34, a multi-channel analog to digital convertor 36, a microcomputer 37, an AOTF tuner 38, and a regulated power supply 39. The first minor 17, the second collection lens 19, the first detector 26 and the first amplifier 31 define a first test channel; and the second mirror 18, the third collection lens 20, the second detector 27 and the second amplifier 32 define a second test channel. The fourth collection lens 21, the third detector 28 and the third amplifier 33 define a first reference channel and the fifth collection lens 22, the fourth detector 29 and the fourth amplifier 34 define a second reference channel.

The discrete light source 10 preferably is a device that provides a broadband of visible and/or infrared light, such as a Nernst glower or a quartz-tungsten-halogen lamp. The AOTF preferably includes a $TeO_2$ crystal. The test cell 24 is disposed in the spatial region of interest 25, such as within a pipe of a chemical processing system or a natural gas pipe line to measure the concentration of a given substance in the pipe, adjacent to a roadway to measure the concentration of automobile exhaust pollutants, in an industrial plant smoke stack to measure the concentration of given substances in the smoke or adjacent to living tissue to measure the concentration of a given substance emanating from such tissue, for example. The test cell 24 has windows for enabling light to pass through the cell 24 and may be open to the surrounding environment. The detectors 26, 27, 28, 29 preferably include semiconductor crystals selected from a group including HgCdTe, InAs, InSb, HgCdZn and PbS.

The optical system is disposed in relation to the light source 10 and the AOTF 12 such that the light from the light source 10 is directed by the first collimating lens 13, the first collection lens 14, and the second collimating lens 15 through the spatial aperture defined by the plate 16 to the AOTF 12. The reflector 11 reflects light received from the light source 10 toward the first collimating lens 13. The AOTF 12 is disposed between the light source 10 and the spatial region of interest 25 occupied by the test cell 24.

The AOTF 12 filters light from the light source 10 and the light emerges from the AOTF 12 in a simultaneous plurality of distinct beams 40$a$, 40$b$, 41$a$, 41$b$ having different orders of diffraction, with different diffraction orders having different wavelength ranges. Complementary pairs 40a, 40b and 41a, 41b of the distinct beams having the same diffraction order respectively have substantially the same wavelength ranges. In one preferred embodiment wherein the AOTF 12 includes a TeO$_2$ crystal, a first pair of complementary beams 40a, 40b having a first diffraction order emerge from the AOTF 12 at an angle of approximately 7.5 degrees and have a wavelength range of approximately 3 microns to 5 microns; and a second pair of complementary beams 41a, 41b having a second diffraction order emerge from the AOTF 12 at an angle of approximately 4.5 degrees and have a wavelength range of approximately 1.5 microns to 2.5 microns. A beam stop 42 is disposed for absorbing undiffracted light emerging from the AOTF 12.

The beam 40a emerging at the first diffraction order is directed by the first mirror 17 through one set of entrance and exit windows (not shown) in the test cell 24 and focussed by the second collection lens 19 to the first detector 26; and the beam 41a emerging at the second diffraction order is directed by the second mirror 18 through a second set of entrance and exit windows in the test cell 24 and focussed by the third collection lens 20 to the second detector 27. In an alternative embodiment, the test cell 24 is eliminated and the beams 40a and 41a are directed through the spatial region of interest 25 to the respective second and third collection lenses 19 and 20. In another alternative preferred embodiment, the beams 40a and 41a are directed to the spatial region of interest, which may or may not include the test cell 24, by a combination of lenses and optical fibers (not shown) instead of by the mirrors 17 and 18. The path lengths of the light in the different diffraction orders that are directed through the spatial region do not have to be the same.

When the light entering the AOTF 12 is not polarized, the two complementary beams emerging from the AOTF 12 in each diffraction order are of approximately equal brightness, such that one beam of each complementary pair of beams can be used as a reference beam and the other beam of each complementary pair of beams can be used as a test beam. Accordingly, the complementary beam 40b emerging at the first diffraction order is directed outside the spatial region of interest to the fourth collection lens 21, which focuses such complementary beam 40b to the third detector 28; and the beam 41b emerging at the second diffraction order is directed outside the spatial region of interest to the fifth collection lens 22, which focuses such complementary beam 41b to the fourth detector 29.

The first and second detectors 26, 27 respond to the light that they detect by simultaneously providing test signals that are indicative of a spectrum within the spatial region of interest at wavelengths that are characteristic of the spectrum for the given substance or of the spectra for two different given substances. The third and fourth detectors 28, 29 respond to the light that they detect by providing simultaneously with the test signals continuous real-time reference signals that are indicative primarily of a spectrum of the light source at wavelengths that are characteristic of the spectrum for the given substance or of the spectra for two different given substances.

The signals provided by first, second third and fourth detectors 26, 27, 28, 29 are respectively amplified by the first, second third and fourth amplifiers 31, 32, 33, 34, converted to digital signals by the multi-channel analog-to-digital (A/D) converter 36 and then provided as digital signals to the microcomputer 37. The microcomputer 37 processes such digital signals to measure the concentration of the given substance(s) within the spatial region of interest 25.

The microcomputer 37 determines the ratio of the test signal for a given test channel to the reference signal for the corresponding reference channel as a basis for deriving the spectrum within the spatial region of interest 25. Such ratio is adjusted by the microcomputer 37 for experimentally determined losses in each channel. In addition, the microcomputer 37 controls the collection and analysis of the spectral data, including the switching of the AOTF 12 on and off to provide modulated diffracted light beams of light from the AOTF 12 so that modulated test and reference signals are provides by the first, second third and fourth detectors 26, 27, 28, 29 respectively in response to detection of the modulated diffracted light beams. Such modulation makes it easier to detect the test and reference signals.

The microcomputer 37 further controls the AOTF tuner 38 to tune the AOTF 12 to diffract the light entering the AOTF 12 in a simultaneous plurality of a given number of distinct beams having different predetermined diffraction orders that have different wavelength ranges that include wavelengths that are characteristic of a spectrum for a given substance or of the spectra for a plurality of different given substances. To detect and measure concentrations of a large number of different given substances, the tuner 38 rapidly tunes the AOTF 12 to provide a plurality of distinct diffracted light beams having a set of predetermined wavelengths that are characteristic of the spectra for the different given substances.

In one preferred embodiment, the characteristic wavelengths of the different diffracted distinct beams to which the AOTF 12 is tuned are wavelengths that are characteristic of an energy absorption spectrum for a given substance or of the energy absorption spectra for a plurality of given substances. In this preferred embodiment, the first detector 26 and the third detector 28 detect the filtered light focussed from the beams 40a and 40b respectively at a wavelength that is characteristic of the energy absorption of one given substance; the second detector 27 and the fourth detector 29 detect the filtered light focussed from the beams 41a and 41b respectively at a wavelength that is characteristic of the energy absorption spectrum of the one given substance or of a different given substance; and the microcomputer 37 processes the digital signals derived from the first, second third and fourth detectors 26, 27, 28, 29 in accordance with an energy absorption spectrum measurement technique to measure the concentration of the given substance or given substances within the spatial region of interest. A light source 10 that provides unpolarized light for diffraction by the AOTF 12 is used for this preferred embodiment.

The light source 10 is energized by the regulated power supply 39, which is regulated by the microcomputer 37 in accordance with the amplitude of the reference signals derived from the third and fourth detectors 27 and 29 to maintain the brightness of the light from the light source 10 at a predetermined level. The provision of a simultaneous real-time reference signal by the third and fourth detectors 27 and 29 enables the microcomputer 37 to immediately correct for changes in light source brightness and to correct for color changes over the lifetime of the spectrometer.

Figure 2A:
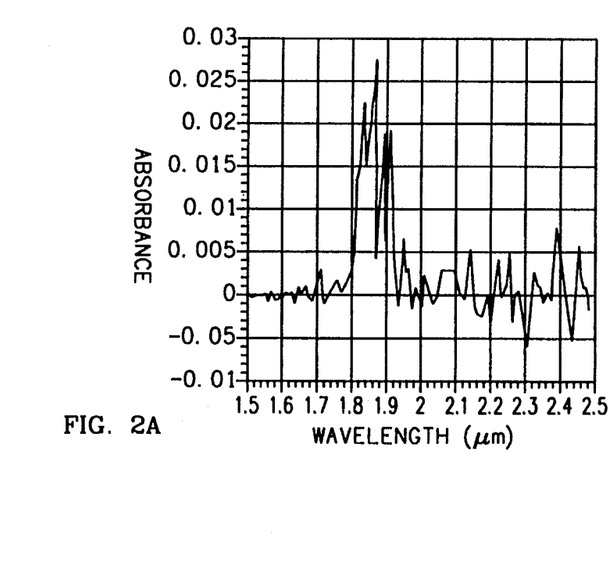
FIGS. 2A and 2B are plots of spectra detected in wavelength ranges within two different diffraction orders of light diffracted by a single AOTF in the spectrometer of FIG. 1.
Figure 2B:
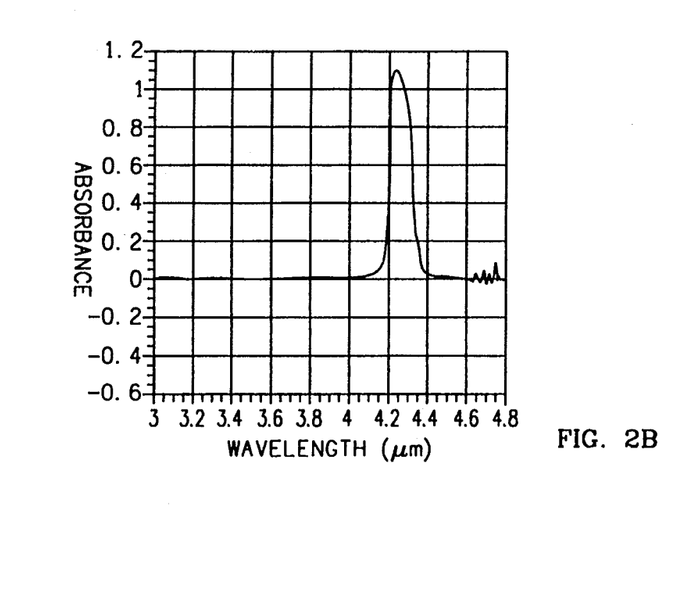

FIGS. 2A and 2B are plots of energy absorption spectra detected in wavelength ranges within two different diffraction orders of light simultaneously diffracted by a single AOTF in the spectrometer of FIG. 1. The measurements were made at room temperature and pressure with the light source 10 being about two meters from each of the first and second detectors 26, 27. The large feature centered about 1.87 microns in the spectrum of FIG. 2A is due to energy absorption by water vapor and the low amplitude features are not statistically significant. The spectral resolution of this spectrum is about 4 nm at the water vapor feature. The large feature centered about 4.25 microns in the spectrum of FIG. 2B is due to energy absorption by carbon dioxide. The smaller features to the light of 4.6 microns are due to noise. The spectral resolution of this spectrum is about 43 nm at the carbon dioxide feature.

Figure 3:
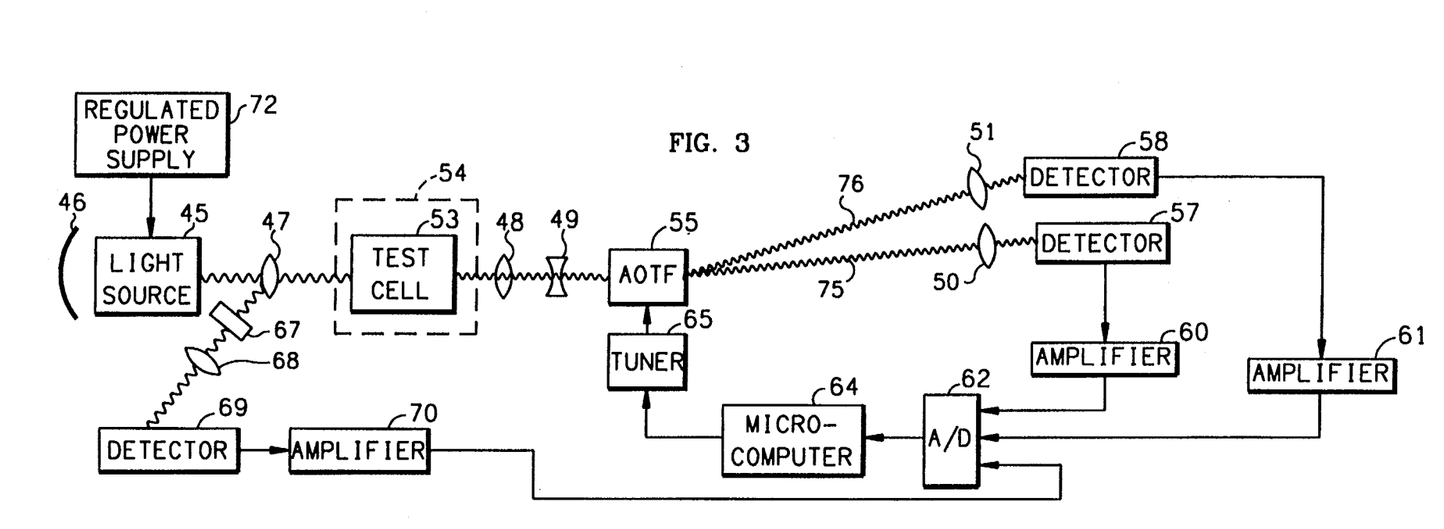
FIG. 3 is a block diagram of an alternative preferred embodiment of the tunable spectrometer according to the same aspect of the present invention as FIG. 1.

Referring to FIG. 3, another preferred embodiment of a tunable spectrometer according to the present invention includes a discrete light source 45, a reflector 46, an optical system including a first collimating lens 47, a collection lens 48 and a second collimating lens 49, a second collection lens 50, a third collection lens 51, a test cell 53 disposed in a region of interest 54, a temperature-controlled narrowband acousto-optical tunable filter (AOTF) 55, a first detector 57, a second detector 58, a first amplifier 60, a second amplifier 62, a multi-channel analog to digital convertor 62, a microcomputer 64, an AOTF tuner 65, a reference channel system including a narrowband filter 67, a fourth collection lens 68, a third detector 69 and an third amplifier 70, and a regulated power supply 72. The second collection lens 50, the first detector 57 and the first amplifier 60 define a first test channel; and the third collection lens 51, the second detector 58 and the second amplifier 61 define a second test channel.

The discrete light source 45, the test cell 53, the AOTF 55 and the detectors 57, 58 have the same characteristics as the corresponding elements in the preferred embodiment described above with reference to FIG. 1.

The optical system is disposed in relation to the light source 45 such that the light from the light source 45 is directed by the first collimating lens 47 through the test cell 53, the first collection lens 48, and the second collimating lens 49 to the AOTF 55. The reflector 46 reflects light received from the light source 45 toward the collection lens 47. The spatial region of interest 54, which is occupied by the test cell 53, is disposed between the light source 45 and the AOTF 55.

The AOTF 55 filters light from the light source 45 and the light emerges from the AOTF 55 in a simultaneous plurality of distinct beams 75, 76 having different orders of diffraction, with different diffraction orders having different wavelength ranges.

The beam 75 emerging at the first diffraction order is focused to the first detector 57 by the second collection lens 50; and the beam 76 emerging at the second diffraction order is focused to the second detector 58 by the third collection lens 51. In an alternative embodiment, the test cell 53 is eliminated and the light from the light source 45 is directed through the spatial region of interest to the AOTF 55.

The first and second detectors 57, 58 respond to the light that they detect by simultaneously providing test signals that are indicative of a spectrum within the spatial region of interest at wavelengths that are characteristic of the spectrum for the given substance or of the spectra for two different given substances.

Light from the light source 45 that is reflected by the lower front surface of the first collimating lens 47 is filtered by the narrowband filter 67 and directed outside the spatial region of interest 54 to the third detector 69 by the fourth collection lens 68. The third detector 69 responds to the light that it detects by providing simultaneously with the test signals a continuous real-time reference signal.

The signals provided by the first, second and third detectors 57, 58, 69 are respectively amplified by the first, second and third amplifiers 60, 61, 70, converted to digital signals by the multi-channel analog-to-digital (A/D) converter 62 and then provided as digital signals to the microcomputer 64. The microcomputer 64 processes such digital signals to measure the concentration of the given substance within the spatial region of interest.

The microcomputer 64 determines the ratio of the test signal for a given channel to the reference signal as a basis for deriving the spectrum within the spatial region of interest 54. Such ratio is adjusted by the microcomputer 64 for experimentally determined losses in each channel. In addition, the microcomputer 64 controls the collection and analysis of the spectral data, including the switching of the AOTF on and off to provide modulated diffracted beams of light from the AOTF 55.

The microcomputer 64 further controls the AOTF tuner 65 to tune the AOTF 55 to simultaneously diffract the light entering the AOTF 55 in a simultaneous plurality of a given number of distinct beams having different diffraction orders that have predetermined wavelength ranges that include wavelengths that are characteristic of a spectrum for a given substance or of the spectra for a plurality of different given substances. To detect and measure concentrations of a large number of different given substances, the tuner 55 rapidly tunes the AOTF 55 to provide a plurality of distinct diffracted light beams having a set of predetermined wavelengths that are characteristic of the spectra for the different given substances.

The spectrometer of FIG. 3 can be used for measurements in accordance with an energy absorption spectrum measurement technique in the same manner as described above with reference to the spectrometer of FIG. 1.

Figure 4:
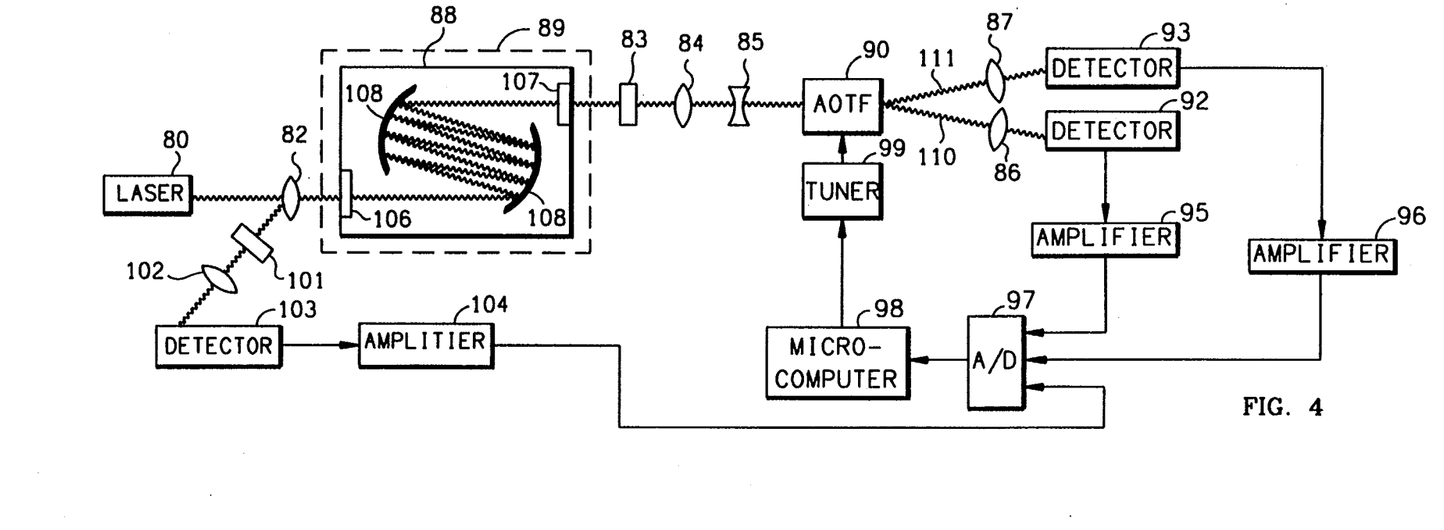
FIG. 4 is a block diagram of a preferred embodiment of the tunable spectrometer according to another aspect of the present invention.

Referring to FIG. 4, a preferred embodiment of a tunable spectrometer according to the present invention that uses a Raman scattering spectrum measurement technique includes a discrete light source 80, an optical system including an imaging lens 82, an optical notch filter 83, a first collection lens 84 and a collimating lens 85, a second collection lens 86, a third collection lens 87 a test cell 88 disposed in the spatial region of interest 89, a temperature-controlled narrowband acousto-optical tunable filter (AOTF) 90, a first detector 92, a second detector 93, a first amplifier 95, a second amplifier 96, a multi-channel analog to digital convertor 97, a microcomputer 98, an AOTF tuner 99 and a reference channel system including a narrowband interference filter 101, a fourth collection lens 102, a third detector 103 and a third amplifier 104.

The discrete light source 80 preferably is a polarized ultraviolet or visible wavelength laser. Suitable lasers include Nitrogen, HeCd, Nd:YAG, Argon and HeNe lasers. The preferred laser is a diode-pumped Nd:YAG laser that has been frequency doubled or tripled. Both continuous wave and pulsed lasers may be used. The narrowband interference filter 101 is centered on the fundamental frequency of the monochromatic laser.

Optical fibers (not shown) can be used for directing the light beam into and/or from the test cell 88 instead of the focusing lens 82 and/or the first collection lens 84.

The test cell 88 includes an entrance window 106 an exit window 107 and a pair of mirrors 108 disposed within the cell 88. The mirrors 108 are curved for reflecting the light entering through the entrance window 106 to pass a plurality of round trips between the mirrors 108 before emerging from the spatial region of interest through the exit window 107 to thereby enhance Raman scattering of the light by any molecules of given substance of interest within the cell while the light passes through the spatial region of interest 89. The curvature of the mirrors 108 preferably is such as to cause the light to make at least ten round trips before exiting from the test cell 88. A suitable multi-pass test cell is a Herriott or White cell. Inside the test cell 88, the monochromatic laser light undergoes elastic scattering known as Rayleigh scattering, and Raman scattering off of molecules of the substances that are present within the test cell 88. Raman scattering has the effect of shifting the wavelength of light by known amounts that depend on the type of molecule that is responsible for the scattering.

Raman scattering can occur in spectral regions containing the wavelengths of relatively high-powered lasers, thereby enabling the creation of a measurable number of Raman scattered photons over path lengths of about one meter using only a 10 mW laser. Accordingly, a laser is preferred as the light source in the embodiments of the present invention utilizing a Raman scattering measurement technique.

Figure 5:
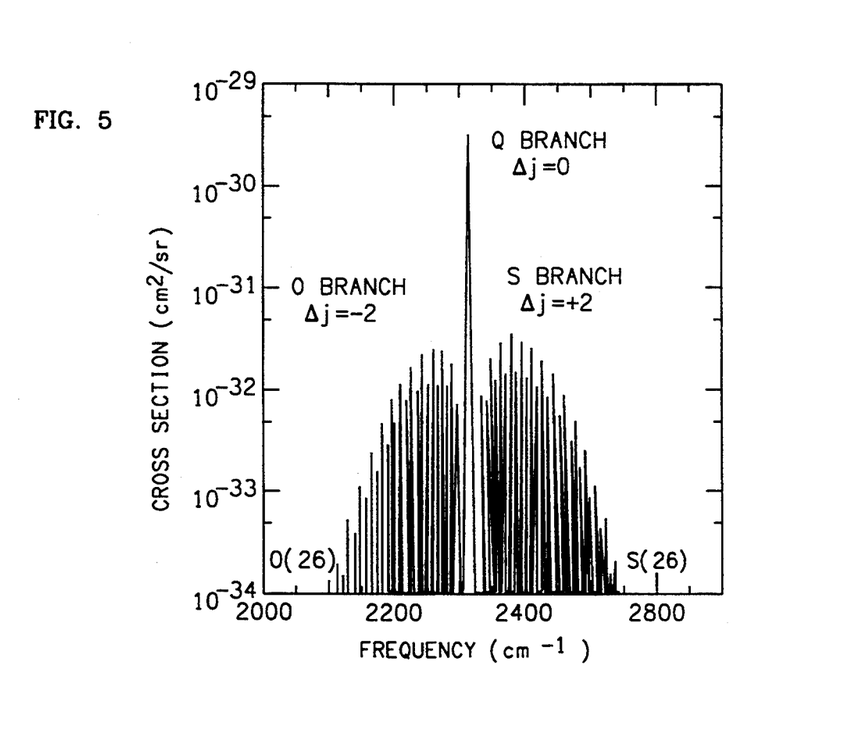
FIG. 5 shows part of a theoretical distribution of a vibrational-rotational Raman scattering probability cross-section for Nitrogen at 300 degrees Kelvin.

FIG. 5 shows part of a theoretical distribution of a vibrational-rotational Raman scattering probability cross-section for Nitrogen at 300 degrees Kelvin. FIG. 5 is taken from a publication by Inaba, H. and T. Kobayasi, "Laser-Raman Radar", Opto-electronics, Vol. 4, pp. 1010-123 (1972).

The AOTF 90 has the same characteristics as the AOTF 12 in the preferred embodiment described above with reference to FIG. 1.

The light from the light source 80 is directed by the imaging lens 82 through the test cell 88, the notch filter 83, the first collection lens 84, and the collimating lens 85 to the AOTF 90. The spatial region of interest, 89 which is occupied by the test cell 88, is disposed between the light source 80 and the AOTF 90.

The optical notch filter 83, such as a holographic notch filter, removes as much of the light at the fundamental wavelength of the monochromatic laser as possible.

The AOTF 90 filters the scattered light from the test cell 88 and the light emerges from the AOTF 90 in a simultaneous complementary pair of distinct beams 110, 111 of the same diffraction order and having approximately the same wavelength range.

One such beam 110 is focused by the second collection lens 86 to the first detector 92; and the other such beam 111 is focused by the third collection lens 87 to the second detector 93.

The light source 80 provides light at a predetermined wavelength; and the first detector 92 and the second detector 93 detect the filtered light focussed from the beams 110 and 111 respectively at a wavelength that is characteristic of the Raman scattering spectrum of one such given substance. By using the two detectors 92, 93 to detect the energy in both of the complementary diffracted beams 110, 111, both polarizations of the Raman scattered light are measured.

The first and second detectors 92, 93 respond to the light that they detect by simultaneously providing test signals that are indicative of a spectrum within the spatial region of interest at wavelengths that characteristic of the Raman scattering spectrum for such given substance Light from the light source 80 that is reflected by the lower from surface of the imaging lens 82 is filtered by the narrowband interference filter 101 and directed outside the spatial region of interest 89 to the third detector 103 by the fourth collection lens 102. The third detector 103 responds to the light that it detects by providing simultaneously with the test signals a continuous real-time reference signal.

The signals provided by first, second and third detectors 92, 93, 103 are respectively amplified by the first, second and third amplifiers 95, 96, 104, converted to digital signals by the multi-channel analog-to-digital (A/D) converter 97 and then provided as digital signals to the microcomputer 98. The microcomputer 98 processes such digital signals derived from the first, second and third detectors 92, 93, 103 in accordance with a Raman forward scattering spectrum measurement technique to measure the concentration of the given substance within the spatial region of interest 89. Preferably, the measurement technique is a vibrational-rotational Raman scattering technique rather than merely a rotational Raman scattering technique because the latter is more ambiguous.

The microcomputer 98 determines the ratio of the test signal for a given channel to the reference signal as a basis for deriving the spectrum within the spatial region of interest. Such ratio is adjusted by the microcomputer 98 for experimentally determined losses in each channel. In addition, the microcomputer 98 controls the collection and analysis of the spectral data, including the switching of the AOTF 90 on and off to provide modulated diffracted beams of light from the AOTF 90.

The microcomputer 98 further controls the AOTF tuner 99 to tune the AOTF 90 to simultaneously diffract the light entering the AOTF 90 in a simultaneous plurality of a given number of distinct beams having different diffraction orders that have predetermined wavelength ranges that include wavelengths that are characteristic of a Raman scattering spectrum for a given substance or of the spectra for a plurality of different given substances. To detect and measure concentrations of a large number of different given substances, the tuner 99 rapidly tunes the AOTF 90 through a plurality of distinct diffracted light beams having a set of predetermined wavelengths that are characteristic of the Raman scattering spectra for the different given substances.

Figure 6:
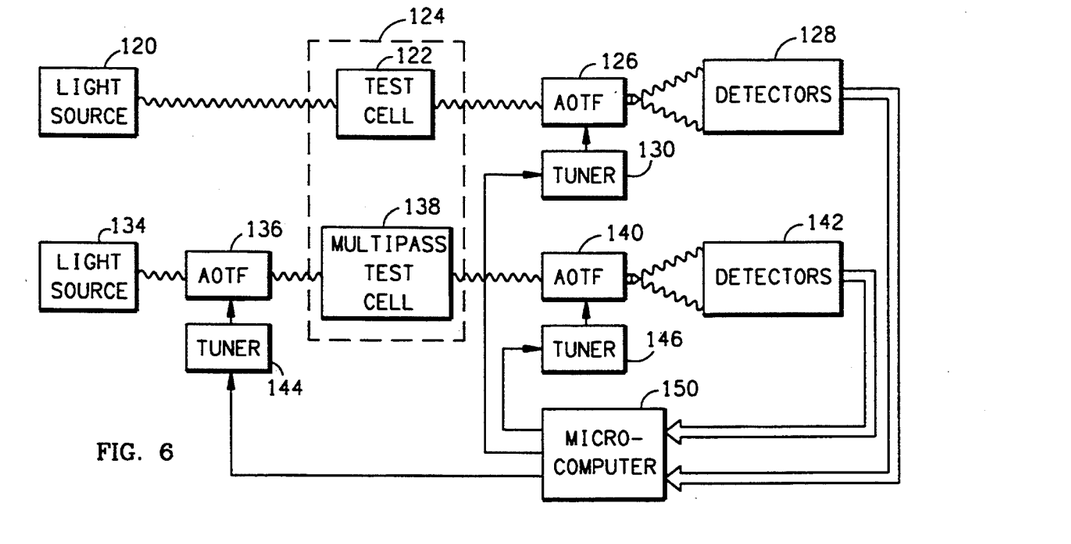
FIG. 6 is a block diagram of portions of a preferred embodiment of the tunable spectrometer according to a further aspect of the present invention.

FIG. 6 shows significant portions of another alternative preferred embodiment of the present invention, in which the concentration of a given substance in a spatial region of interest is measured simultaneously by both an energy absorption spectrum measurement technique and a Raman scattering spectrum measurement technique. The optical system and certain other components of the spectrometer are not shown in FIG. 6 so as to better emphasize the cooperation of the components that are shown.

The spectrometer of FIG. 6 includes a first discrete light source 120, a first test cell 122 disposed in a spatial region of interest 124, a first AOTF 126, a first set of detectors 128, a first tuner 130, a second discrete light source 134, a second AOTF 136, a multi-pass test cell 138 also disposed in the spatial region of interest 124, a third AOTF 140, a second set of detectors 142, a second tuner 144, a third tuner 146 and a microcomputer 150. The first, second and third AOTFs 126, 136, 140 are temperature-controlled narrowband acousto-optical tunable filters.

The first test cell 122 is disposed in the region of interest 124 for receiving light from the first light source 120. The first AOTF 126 is disposed in relation to the test cell 122 for filtering light directed from the first light source 120 that is directed through the first test cell 122. The first set of detectors 128 are disposed in relation to the first AOTF 126 for detecting different distinct beams of diffracted light emerging from the first AOTF 126. The first tuner 130 is coupled to the first AOTF 126 for tuning the first AOTF 126. The first tuner 130 is controlled by the microcomputer 150. The first light source 120, the first test cell 122, the first AOTF 126, the first set of detectors 128 and the microcomputer 150 are combined with the optical system and other components in the spectrometer described with reference to FIG. 1 to measure the concentration of a given substance within the spatial region of interest 124 in accordance with an energy absorption spectrum measurement technique in the same manner as described with reference to the spectrometer of FIG. 1. Other embodiments of an energy absorption spectrometer may be used in the Spectrometer of FIG. 6 in lieu of the energy absorption spectrometer of FIG. 1.

The second AOTF 136 is disposed in relation to the second light source 134 to filter light from the second light source 134. The microcomputer 150 controls the second tuner 144 to tune the second AOTF 136 to pass an undiffracted light beam having a predetermined wavelength; and a beam of light at such wavelength is directed to the multipass test cell 138 by an optical system (not shown), such as the optical system included in the spectrometer of FIG. 4.

The third AOTF 140 is disposed in relation to the multi-pass test cell 138 for filtering the scattered light from the multi-pass test cell 138; and the filtered light emerges from the third AOTF 140 in a simultaneous complementary pair of distinct beams 110, 111 of the same diffraction order and having approximately the same wavelength range.

The microcomputer 150 controls the third tuner 146 to tune the third AOTF 140 to filter the scattered light from the multi-pass test cell 138 so that the light emerges from the AOTF 140 in a simultaneous complementary diffracted pair of distinct beams having a predetermined wavelength that is characteristic of a Raman scattering spectrum for the given substance.

The second set of detectors 142 are disposed in relation to the third AOTF 140 for detecting the complementary diffracted pair of distinct beams that emerge from the third AOTF 140 at the wavelength that is characteristic of the Raman scattering spectrum for the given substance.

The second light source 134, the second AOTF 136, the second tuner 144, the multi-pass test cell 138, the third AOTF 140, the third tune 146, the second set of detectors 142 and the microcomputer 150 are combined with the optical system and other components in the spectrometer described with reference to FIG. 4 to measure the concentration of the given substance within the spatial region of interest 124 in accordance with a Raman scattering spectrum measurement technique in the same manner as described with reference to the spectrometer of FIG. 4. Other embodiments of a Raman scattering spectrometer may be used in the spectrometer of FIG. 6 in lieu of the Raman scattering spectrometer of FIG. 4.

I claim:

1. A tunable spectrometer, comprising
a discrete light source;
an optical system disposed in relation to the light source for directing light from the light source through a spatial region of interest and for focusing the directed light;
an acousto-optical tunable filter disposed for filtering light from the light source, wherein the light emerges from the filter in a simultaneous plurality of distinct beams having different orders of diffraction, with different diffraction orders having different wavelength ranges and with complementary pairs of said distinct beams having the same diffraction order respectively having substantially the same wavelength ranges;
means coupled to the filter for tuning the filter to diffract light in a simultaneous plurality of distinct beams having different predetermined diffraction orders that have different wavelength ranges that include wavelengths that are characteristic of a spectrum for a given substance or of the spectra for a plurality of different given substances; and
a set of a given plural number of detectors disposed in relation to the optical system and the filter for respectively detecting the focused and filtered light diffracted by the filter in a set of said given number of said distinct beams of said different predetermined diffraction orders to thereby simultaneously provide said given number of test signals indicative of a spectrum within the spatial region of interest at wavelengths that are characteristic of said spectrum for said given substance or of the spectra for the plurality of different said given substances.

2. A spectrometer according to claim 1, wherein the filter is disposed between the light source and the spatial region of interest.

3. A spectrometer according to claim 2, further comprising
a second set of said given number of detectors disposed in relation to the optical system and the filter for respectively detecting the filtered light diffracted by the filter in a second set of said given number of said distinct beams of said different predetermined diffraction orders that are complementary to said first recited set of distinct beams to thereby provide simultaneously with the test signals reference signals indicative primarily of a spectrum of the light source at wavelengths that are characteristic of said energy absorption spectrum for said given substance or of the spectra for the plurality of different said given substances.

4. A spectrometer according to claim 1, wherein the filter is disposed between the spatial region of interest and the detectors.

5. A spectrometer according to claim 4, further comprising means for processing the test signals to measure the concentration of said given substance within the spatial region of interest in accordance with a Raman forward scattering measurement technique.

6. A spectrometer according to claim 5, further comprising a test cell disposed within the spatial region of interest and comprising a plurality of mirrors disposed within the cell for reflecting the light to pass a plurality of round trips between the mirrors before emerging from the spatial region of interest to thereby enhance Raman scattering of the light by any molecules of said given substance within the cell while the light passes through the spatial region of interest.

7. A tunable spectrometer, comprising a discrete light source;

an optical system disposed in relation to the light source for directing light from the light source through a spatial region of interest and for focusing the directed light;

an acousto-optical tunable filter disposed for filtering light from the light source, wherein the light emerges from the filter in a simultaneous complementary pair of distinct beams having the same order of diffraction and substantially the same wavelength range;

means coupled to the filter for tuning the filter to diffract light in a simultaneous complementary pair of said distinct beams having a predetermined diffraction order that has a wavelength range that includes a wavelength that is characteristic of a spectrum for a given substance;

a first detector disposed in relation to the optical system and the filter for detecting the focused and filtered light diffracted by the filter in one said beam of said predetermined diffraction order to thereby provide a test signal indicative of a spectrum within the spatial region of interest at a wavelengths that is characteristic of said spectrum for said given substance; and a second detector disposed in relation to the optical system and the filter for detecting the filtered light diffracted by the filter in the complementary other said beam of said predetermined diffraction order to thereby provide simultaneously with the test signal a reference signal indicative primarily of a spectrum of the light source at a wavelength that is characteristic of said spectrum for said given substance.

8. A spectrometer comprising a discrete light source;

an optical system disposed in relation to the light source for directing light from the light source through a spatial region of interest and for focusing the directed light;

a detector disposed in relation to the optical system for detecting the focused light at a wavelength that is characteristic of a Raman scattering spectrum for a given substance to thereby provide a test signal indicative of a Raman scattering spectrum within the spatial region of interest at a wavelength that is characteristic of said Raman scattering spectrum for said given substance;

means for processing the test signal to measure the concentration of said given substance within the spatial region of interest in accordance with a Raman forward scattering measurement technique; and a test cell disposed within the spatial region of interest and comprising a plurality of mirrors disposed within the cell for reflecting the light to pass a plurality of round trips between the mirrors before emerging from the spatial region of interest to thereby enhance Raman scattering of the light by any molecules of said given substance within the cell while the light passes through the spatial region of interest.

9. A spectrometer comprising a discrete light source;

an optical system disposed in relation to the light source for directing light from the light source through a spatial region of interest and for focusing the directed light;

a detector disposed in relation to the optical system for detecting the focused light at a wavelength that is characteristic of a Raman scattering spectrum for a given substance to thereby provide a test signal indicative of a Raman scattering spectrum within the spatial region of interest at a wavelength that is characteristic of said Raman scattering spectrum for said given substance;

means for processing the test signal to measure the concentration of said given substance within the spatial region of interest in accordance with a Raman forward scattering measurement technique;

an acousto-optical tunable filter disposed between the spatial region of interest and the detector for filtering light from the spatial region of interest, wherein the light emerges from the filter in a simultaneous complementary pair of distinct beams having the same order of diffraction and substantially the same wavelength range;

means coupled to the filter for tuning the filter to diffract light in a simultaneous complementary pair of said distinct beams having a predetermined diffraction order that has a wavelength range that includes a wavelength that is characteristic of a Raman scattering spectrum for the given substance; and a second detector disposed in relation to the optical system and the filter for detecting the filtered and focused light diffracted by the filter in one beam of said predetermined diffraction order to thereby provide simultaneously with the first recited test signal a second test signal indicative of a Raman scattering spectrum within the spatial region of interest at a wavelength that is characteristic of said Raman scattering spectrum for said given substance;

wherein the first recited detector is disposed in relation to the filter for detecting the filtered and focused light diffracted by the filter in the complementary of said beam of said predetermined diffraction order; and wherein the processing means processes both test signals to measure the concentration of said given substance within the spatial region of interest in accordance with a Raman forward scattering measurement technique.

10. A spectrometer according to claim 9, further comprising a test cell disposed within the spatial region of interest and comprising a plurality of mirrors disposed within the cell for reflecting the light to pass a plurality of round trips between the mirrors before emerging from the spatial region of interest to thereby enhance Raman scattering of the light by any molecules of said given substance within the cell while the light passes through the spatial region of interest.

11. A spectrometer comprising
a discrete light source;
an optical system disposed in relation to the light source for directing light from the light source through a spatial region of interest and for focusing the directed light;
a detector disposed in relation to the optical system for detecting the focused light at a wavelength that is characteristic of a Raman scattering spectrum for a given substance to thereby provide a test signal indicative of a Raman scattering spectrum within the spatial region of interest at a wavelength that is characteristic of said Raman scattering spectrum for said given substance;
means for processing the test signal to measure the concentration of said given substance within the spatial region of interest in accordance with a Raman forward scattering measurement technique;
a narrowband acousto-optical tunable filter disposed between the light source and the spatial region of interest for filtering said light provided by the light source; and
means coupled to the first filter for tuning the first filter to a predetermined wavelength.

12. A spectrometer according to claim 11, further comprising
a test cell disposed within the spatial region of interest and comprising a plurality of mirrors disposed within the cell for reflecting the filtered light to pass a plurality of round trips between the mirrors before emerging from the spatial region of interest to thereby enhance Raman scattering of the light by any molecules of said given substance within the cell while the light passes through the spatial region of interest.

13. A spectrometer according to claim 11, further comprising
a second acousto-optical tunable filter disposed between the spatial region of interest and the detector for filtering light from the spatial region of interest, wherein the light emerges from the second filter in a simultaneous-complementary pair of distinct beams having the same order of diffraction and substantially the same wavelength range;
means coupled to the second filter for tuning the second filter to diffract light in a simultaneous complementary pair of said distinct beams having a predetermined diffraction order that has a wavelength range that includes a wavelength that is characteristic of a Raman scattering spectrum for the given substance; and
a second detector disposed in relation to the optical system and the second filter for detecting the filtered and focused light diffracted by the second filter in one beam of said predetermined diffraction order to thereby provide simultaneously with the first recited test signal a second test signal indicative of a Raman scattering spectrum within the spatial region of interest at a wavelength that is characteristic of said Raman scattering spectrum for said given substance;
wherein the first recited detector is disposed in relation to the filter for detecting the filtered and focused light diffracted by the second filter in the complementary of said beam of said predetermined diffraction order; and
wherein the processing means processes both test signals to measure the concentration of said given substance within the spatial region of interest in accordance with a Raman forward scattering measurement technique.

14. A spectrometer according to claim 13, further comprising
a test cell disposed within the spatial region of interest and comprising a plurality of mirrors disposed within the cell for reflecting the filtered light from the first filter to pass a plurality of round trips between the mirrors before emerging from the spatial region of interest to thereby enhance Raman scattering of the light by any molecules of said given substance within the cell while the light passes through the spatial region of interest.

15. A spectrometer comprising
a discrete light source;
an optical system disposed in relation to the light source for directing light from the light source through a spatial region of interest and for focusing the directed light;
a detector disposed in relation to the optical system for detecting the focused light at a wavelength that is characteristic of a Raman scattering spectrum for a given substance to thereby provide a test signal indicative of a Raman scattering spectrum within the spatial region of interest at a wavelength that is characteristic of said Raman scattering spectrum for said given substance;
means for processing the test signal to measure the concentration of said given substance within the spatial region of interest in accordance with a Raman forward scattering measurement technique;
a second discrete light source;
a second optical system disposed in relation to the second light source and the spatial region of interest for directing light from the second light source through the spatial region of interest and for focusing the directed light from the second light source;
an acousto-optical tunable filter disposed for filtering light from the second light source;
means coupled to the filter for tuning the filter to provide the filtered light at a tuned wavelength that is characteristic of an energy absorption spectrum for said given substance;
a second detector disposed in relation to the optical system for detecting the focused and filtered light from the second light source at said tuned wavelength to thereby provide a second test signal indicative of an energy absorption spectrum for said spatial region of interest at a wavelength that is characteristic of said energy absorption spectrum for said given substance; and
means for processing the second test signal to measure the concentration of said given substance within the spatial region of interest in accordance with an energy absorption spectrum measurement technique.

* * * * *